Dec. 10, 1929.  R. L. DENNISON  1,738,695

POWER TRANSMISSION GEARING

Original Filed Jan. 20, 1927  2 Sheets-Sheet 1

Inventor
ROBERT L. DENNISON
By
Attorney

Dec. 10, 1929.  R. L. DENNISON  1,738,695
POWER TRANSMISSION GEARING
Original Filed Jan. 20, 1927  2 Sheets-Sheet 2
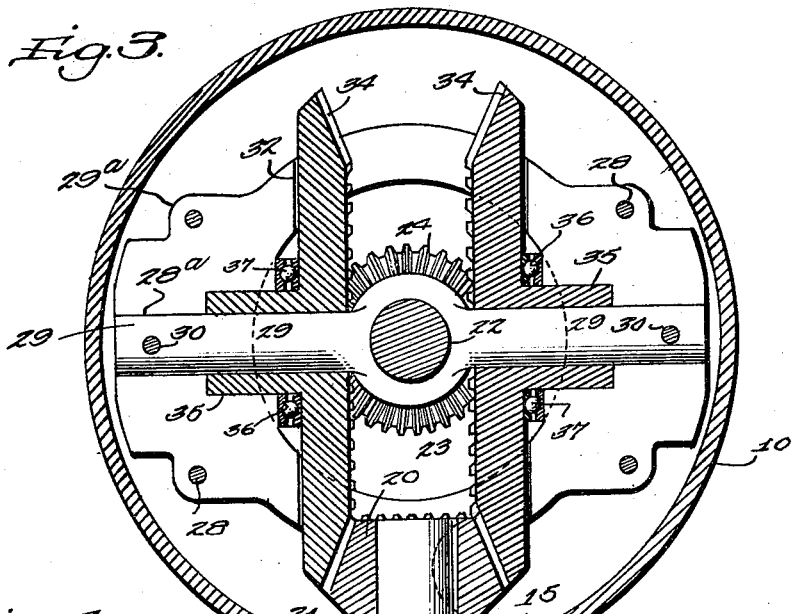
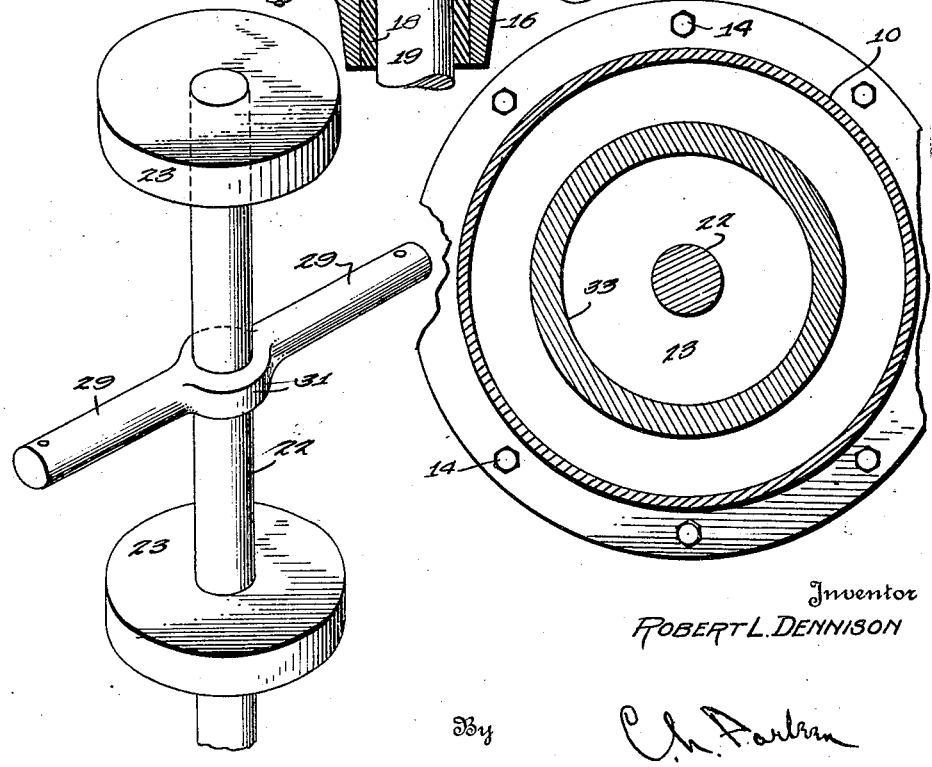
Inventor
ROBERT L. DENNISON
By
Attorney Patented Dec. 10, 1929

1,738,695

UNITED STATES PATENT OFFICE

ROBERT L. DENNISON, OF KANSAS CITY, MISSOURI

POWER-TRANSMISSION GEARING

Application filed January 20, 1927, Serial No. 162,353. Renewed October 29, 1929.

This invention relates to power transmission gearing.

An important object of the invention is to provide novel gearing for the angular transmission of power wherein the turning force on opposite sides of the gears employed is equalized to effectually minimize wear on the gears and to reduce friction.

A further object is to provide a gearing of the character referred to wherein bevel gears are employed for the angular transmission of power and wherein the turning forces exerted on the gears are equalized on opposite sides thereof to prevent lateral thrusts from being transmitted to the gears and thus to eliminate uneven wearing of the bearings and more efficiently to transmit power.

A further object is to provide a drive shaft and a driven shaft arranged at an angle to each other and provided with bevel pinions, and a pair of power transmitting bevel gears meshing with said pinions on opposite sides thereof to equalize the transmission of power.

A further object is to provide novel supporting means for the power transmitting bevel gears whereby the latter are adapted to slightly alter their positions according to the forces delivered to the gears whereby such forces are wholly equalized.

Other objects and advantages of the invention will become apparent during the course of the following description.

In the drawings I have shown one embodiment of the invention. In this showing,

Figure 3 is a horizontal section on line 3—3 of Figure 1,

Figure 4 is a detail perspective of a portion of the driven shaft and associated elements, and, Figure 5 is a detail section on line 5—5 of Figure 2.

Figure 1:
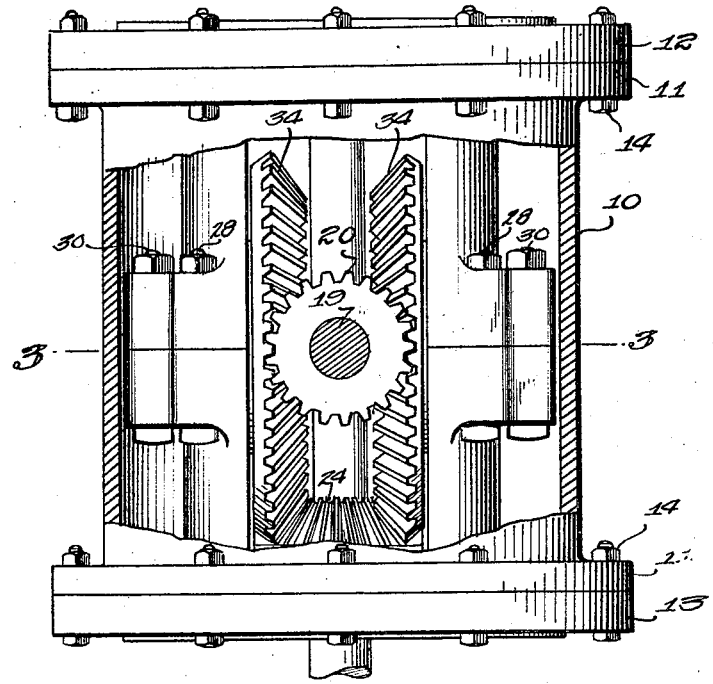
Figure 1 is a side elevation, parts being broken away.

Referring to the drawings the numeral 10 designates a stationary cylindrical casing as a whole flanged at opposite ends as at 11 for connection with upper and lower heads 12 and 13, the latter being secured in position by bolts 14 passing through the flanges and heads. The casing is provided at one side with an opening 15, as shown in Figure 3, and a bearing 16 is secured against this opening by bolts or the like 17. A bushing 18 is arranged in the bearing 16 and rotatably receives a drive shaft 19 having a bevel pinion 20 arranged on its inner end. A thrust bearing 21 surrounds the shaft 19 between the pinion 20 and bearing 16. The shaft 19 constitutes the drive shaft and is connected with any suitable source of power, as will be obvious.

Figure 2:
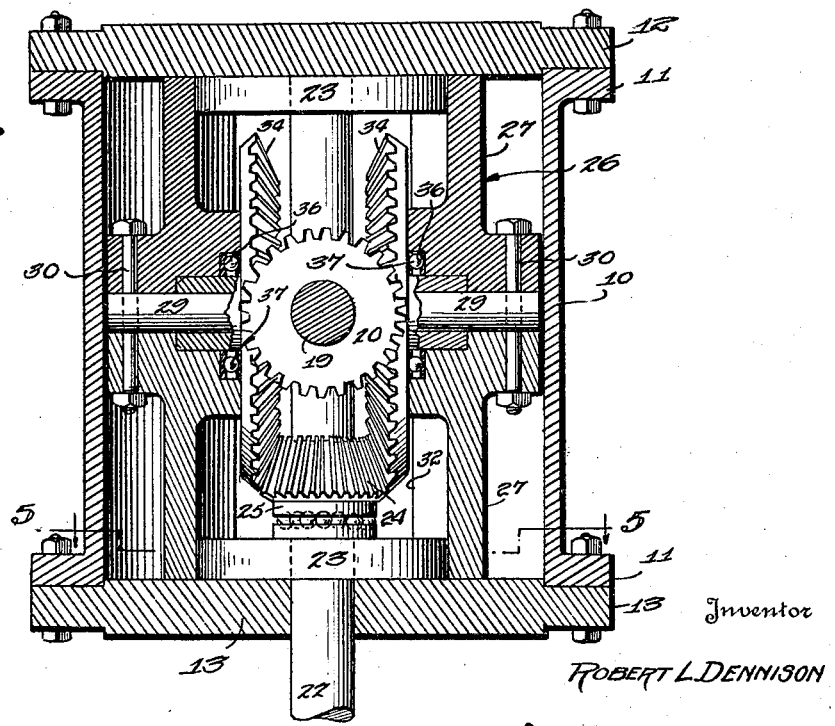
Figure 2 is a central vertical sectional view, parts being shown in elevation.

A driven shaft 22 is arranged axially within the casing 10 and is journalled in the lower head 13, as shown in Figure 2. The driven shaft is provided adjacent the heads 12 and 13 with bearing disks 23 for a purpose to be described. A driven pinion 24 is secured to the shaft 22, and a suitable thrust bearing 25 is arranged between the pinion 24 and lower disk 23.

A frame indicated as a whole by the numeral 26 is arranged within the casing 10. The frame 26 comprises upper and lower sections 27 secured together by bolts 28 passing through flanges 29ª formed on the adjacent ends of the sections. The adjacent faces of the sections 27 are provided with complementary semi-cylindrical cut out portions 28ª to receive a transverse shaft 29, and this shaft is secured to the frame 26 by bolts 30 passing through the ends of the shaft and the adjacent portions of the frame. The shaft 29 is provided centrally thereof with a preferably integral bearing 31 in which the shaft 22 is rotatably mounted. The frame sections 27 are provided with longitudinally extending slots 32, and the ends of the frame sections are circular as indicated at 33 (see Figure 5). The circular portions 33 act as bearings to receive the disks 23.

A pair of oppositely arranged bevel gears 34 are mounted freely on the shaft 29, and are provided with hubs 35 surrounding this shaft. The casing sections are recessed as at 36 to receive thrust bearings 37 to minimize friction due to end thrusts against the gears 34.

The operation of the device is as follows:

The device is adapted to be employed in any desired manner as means for angularly transmitting power, and in actual practice it has been found particularly desirable as power transmission means for driving deep well pumps of the rotary type. In operation, power is applied to the shaft 19 to drive the pinion 20, and rotation of this pinion obviously will drive the gears 34 in opposite directions. Rotation of the gears 34 is, in turn, transmitted to the pinion 24 to rotate the shaft 22, the power of this shaft being utilized in any desired manner, such as for driving deep well pumps. As is well known, the transmission of power between bevel gears causes considerable lateral thrust on the shafts and bearings thus causing the latter to unevenly wear and greatly increasing the friction. The operation of such a device also results in the rapid wearing of the gear teeth. With the present construction, power is delivered from opposite sides of the pinion 20 thus tending to equalize the delivery of power and to minimize side thrusts on the shaft 19 and bushing 18. In a similar manner, power is delivered substantially equally to opposite sides of the pinion 24, thus eliminating side thrusts on the shaft 22. The delivery of power equally from opposite sides of the gears is not only equalized, but the wearing of the gear teeth is greatly retarded. With the structure thus described, however, it has been found that perfect equalization of strains is not obtained, although this structure in itself embodies material advantages over the usual gearing constructions provided for the same purpose. In order to effect perfect equalization in the delivery of power, the frame 26 is provided. This frame is supported in position by the heads 12 and 13 and is adapted to partake of limited rotary movement about the axis of the driven shaft 22, the disks 23 acting as bearings for the frame. With the provision of this construction, it has been found that if a slight excess in power is delivered to one of the gears 34, or from one of these gears to the pinion 24, the frame 26 is adapted to slightly alter its position about the axis of the shaft 22, thus perfectly effecting the equalization in the delivery of power. When the apparatus is accurately constructed, it will be understood that the movement of the frame 27 about the axis of the shaft 22 is extremely slight but in actual practice has been found to perfectly equalize the delivery of power and the apparatus is adapted to be operated over long periods of time with very slight wear to the gear teeth and without the transmission of lateral thrusts to any of the bearings. In view of the inherent characteristics of the device as just described, it is particularly adapted for the transmission of relatively high rotative speeds.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a drive shaft and a driven shaft, pinions mounted on said shafts, a plurality of transmission gears meshing with each of said pinions at equidistantly spaced points, and means for enabling said transmission gears to alter their positions about the axis of one of said shafts.

2. Apparatus of the character described comprising a drive shaft and a driven shaft arranged at an angle to each other, a pair of oppositely arranged bevel gears freely rotatable about their own axes and meshing with each of said pinions on opposite sides thereof, and means for enabling said bevel gears to alter their positions about the axis of one of said shafts.

3. Apparatus of the character described comprising a drive shaft and a driven shaft arranged at an angle to each other, a bevel pinion mounted on each of said shafts, a pair of oppositely arranged bevel gears freely rotatable about their own axes and meshing with each of said pinions on opposite sides thereof, and means for supporting said gears to permit them to simultaneously alter their positions in the same direction about the axis of one of said shafts.

4. Apparatus of the character described comprising a drive shaft and a driven shaft arranged at an angle to each other, a bevel pinion mounted on each of said shafts, a pair of oppositely arranged bevel gears freely rotatable about their own axes and meshing with each of said pinions on opposite sides thereof, and a frame supporting said gears to permit them to simultaneously alter their positions in the same direction about the axis of one of said shafts.

5. Apparatus of the character described comprising a drive shaft and a driven shaft arranged at an angle to each other, a bevel pinion mounted on each of said shafts, a pair of oppositely arranged bevel gears freely rotatable about their own axes and meshing with each of said pinions on opposite sides thereof, a member for supporting said gears, and means for rotatably supporting said member to permit said gears to simultaneously alter their positions in the same direction about the axis of one of said shafts.

6. Apparatus of the character described comprising a drive shaft and a driven shaft arranged at an angle to each other, a bevel pinion mounted on each of said shafts, a pair of oppositely arranged bevel gears freely rotatable about their own axes and meshing with each of said pinions on opposite sides thereof, a fixed shaft about which said bevel gears are rotatable, a frame supporting said fixed shaft, and means for enabling said frame to alter its position about the axis of one of said first named shafts.

7. Apparatus constructed in accordance with claim 6 wherein said means comprises a casing, and bearings for said first named shafts carried by said casing.

8. Apparatus of the character described comprising a substantially cylindrical casing, a pair of bearings carried by said casing substantially at right angles to each other, one of said bearings being arranged axially with respect to said casing, drive and driven shafts journaled in said bearings, a bevel pinion mounted on each of said shafts within said casing, oppositely arranged bevel gears meshing with each of said pinions on opposite sides thereof, and means arranged in said casing and supporting said bevel gears to permit the latter to simultaneously alter their position in one direction about the axis of one of said shafts.

9. Apparatus of the character described comprising a substantially cylindrical casing, a pair of bearings carried by said casing substantially at right angles to each other, one of said bearings being arranged axially with respect to said casing, drive and driven shafts journaled in said bearings, a bevel pinion mounted on each of said shafts within said casing, oppositely arranged bevel gears meshing with each of said pinions on opposite sides thereof, a fixed shaft supporting said bevel gears to permit free rotation thereof with respect to each other, and a frame carrying said fixed shaft and rotatably supported in said casing coaxially with one of said first named shafts.

In testimony whereof I affix my signature.

ROBERT L. DENNISON.